United States Patent [19]

Menard et al.

[11] Patent Number: 6,061,056

[45] Date of Patent: May 9, 2000

[54] TELEVISION MONITORING SYSTEM WITH AUTOMATIC SELECTION OF PROGRAM MATERIAL OF INTEREST AND SUBSEQUENT DISPLAY UNDER USER CONTROL

[75] Inventors: Robert Menard; Roger MacLean, both of Nepean; Paul Streatch, Richmond, all of Canada

[73] Assignee: Telexis Corporation, Kanata, Canada

[21] Appl. No.: 08/894,941

[22] PCT Filed: Mar. 4, 1996

[86] PCT No.: PCT/CA96/00131

§ 371 Date: Nov. 17, 1997

§ 102(e) Date: Nov. 17, 1997

[87] PCT Pub. No.: WO96/27840

PCT Pub. Date: Sep. 12, 1996

[51] Int. Cl.[7] .................................................. H04N 5/445
[52] U.S. Cl. ................................. 345/327; 348/1
[58] Field of Search .............................. 348/12, 13, 460, 348/462, 1, 10, 468; 455/6.2, 6.3, 2; 345/327, 1–5.5

[56] References Cited

U.S. PATENT DOCUMENTS 5,019,899   5/1991   Boles et al. .............................. 358/84
5,481,296   1/1996   Cragun et al. ............................ 348/13

*Primary Examiner*—Nathan Flynn
*Attorney, Agent, or Firm*—Marks & Clerk

[57] ABSTRACT

A system for monitoring standard broadcast signals, comprises a device for receiving the broadcast signals, a user-operable selection device for inputting criteria identifying program content of interest to the user, a database for storing data representing the criteria, and a recognition device for generating from the broadcast signals a program data stream representative of the program content. A comparator for compares the program data with the stored data, and an output device carries out a predetermined action, such recording a segment of the program, when the program data matches the stored data. The system will, for example, activate a window on a multimedia PC when preselected program material is present in the broadcast signals.

59 Claims, 13 Drawing Sheets

TELEVISION MONITORING SYSTEM WITH AUTOMATIC SELECTION OF PROGRAM MATERIAL OF INTEREST AND SUBSEQUENT DISPLAY UNDER USER CONTROL

This invention relates to a system for automatically monitoring broadcasts, such as television broadcasts, and detecting content of particular interest to individual viewers.

Many organizations, for example, stock brokerage services, have an on-going need to monitor world events. It is known for such organizations to retain media and news scanning services that employ people to watch television to look for particular topics of interest. These services log occurrences of particular items and either advise their customers by telephone or provide reports that may include video clips that they manually put together. For example, the service might continuously record a particular television channel while someone watches it. The person watching will record in a log the occurrences of interest, noting the time and tape position. The recorded tapes will later be searched using the time or tape position from the logs. Edited clips are then put together in a time consuming manual process.

The shortcomings with this method are many. The response time in noticing an event of interest is slow, typically minutes. Many hours may pass before the interested party is informed of the event. The cost of paying people to watch television is high. For example, at $10 per hour, twelve hours per day, the cost works out at $43,800 per channel per year. Looking up individual video clips is very slow and requires knowledgeable staff because the look-up is keyed to time of occurrence rather than words or phrases. Typical tape fast forwards or rewinds take three to five minutes each. The approach is also inflexible in that any new search on recorded video requires people to watch it all over again, thus incurring the entire overhead again.

Other solutions include raw television capture devices for computers. These capture devices convert the television video to digital format for storage and distribution on computer networks. These products capture the raw footage, but are not in any way dependent on content. They may capture and distribute video, and/or audio, and/or caption text, but they do not alert users to particular topics immediately as they occur on television broadcasts.

Another solution uses a technique called datacasting. With this technique, the broadcaster injects data into the vertical blanking interval (VBI) of the video television a signal that contains information about the program. The data is created by the broadcaster, or source program author. The data usually contains titles, summaries, and other information related to the program. This information can be used by the user to select items of interest. The disadvantage to this approach is that it requires special information to be created at the source and transmitted from the source. It also requires special proprietary hardware to receive the data, and more significantly still requires the user to continually monitor the datacast information. This VBI data injection approach has another major shortcoming in that very few, if any broadcast stations use this technique, and those that do encode it so that special equipment is required to decode it. CNN at Work, sold by Intel is an example of such a product.

An object of the invention is to alleviate the aforementioned disadvantage of the prior art.

SUMMARY OF THE INVENTION

According to the present invention there is provided a system for monitoring broadcast signals, comprising means for receiving the broadcast signals and generating program signal streams to make available programs carried by said broadcast signals; user-operable selection means for inputting criteria identifying program content of interest to a user; a database for storing data representing said criteria; recognition means for generating from said broadcast signals, for each program stream, a program data stream separate from said program streams, said program data stream being representative of program content and changing dynamically therewith; means for synchronizing said program data stream to said program signal streams; a comparator for comparing said program data stream with said stored data; means for storing, when said program data stream matches said stored data, a program segment and the program data stream associated therewith while maintaining synchronism between the program data stream and the program segment; and display means permitting the user to examine a portion of a stored program segment by selecting a portion of the dynamic program data stream corresponding thereto.

The broadcast signals can be any type of signals carrying programs and distributed over a suitable transmission medium, wireless, cable or satellite. In one embodiment, the broadcast signals are television signals (although radio signals can in some cases be used if they are accompanied by program data, as is sometimes the case). The may also be television signals distributed digitally, for example, using the MPEG format.

In the case of television signals, the recognition means can monitor the closed caption text normally transmitted with the signals. Upon detection of certain words or phrases, the system generates an alarm condition to alert the user to the presence of such program content. For instance, in the case of a standard television set, a simple system could just turn up the volume so as to allow the user to hear the audio. In a more sophisticated system, the signals are stored and tagged for subsequent retrieval using database searching techniques.

The predetermined action can be any form of action that permits the user to examine the portion of the program of interest. For example, it can involve recording the program signals and data signals for later review, activating a video window in a computer, or just activating a beeper to alert the user to the broadcast of program content of interest. For example, a message could be sent to a beeper advising the user that "Clinton is on television now", thus enabling him to watch the program on the nearest television set.

In another embodiment voice or pattern recognition techniques can be employed to monitor the audio or video directly.

Thus, with the system according to the invention, users can be automatically alerted to events as they happen. Video, audio and closed captions from television broadcasts can be automatically indexed and stored so they can be retrieved later in whole or in part, using ad hoc queries. Users can retrieve individual clips of video, audio or closed caption text by specifying content, for example by searching for a key word or phrase in addition to the traditional time/position based queries.

The invention is thus capable of automatic detection of content in television broadcasts using computers, synchronizing and capturing the incoming closed captioned text together with the video and audio in a computer environment, and indexing and retrieval of individual sections of video and audio based on the content of, for example, closed caption text.

The invention is applicable to the field of multimedia applications generally. It provides techniques for automatically creating indexed multimedia databases and has many applications. For example, government elected representatives and their assistants can monitor television programs to determine what is being said about them, about their policies, etc. They can be alerted to issues immediately.

Regulated or government organizations can use this invention to monitor television programs for negative (or positive) views on their organizations. They can know about problems reported in the media and react sooner. They can track the media reaction to their policies.

Marketing departments can use this invention to collect information on competitors, customers of the organizations that employ them. They can be alerted to issues immediately. As well, marketing multimedia databases can be built automatically.

Broadcast industry, cable carriers and telephone companies can use this system to create and maintain multimedia databases. Cable Companies and Telco's can use this invention to provide differentiated services to their customers, for example filtering and querying capability on live broadcasts and also on multimedia databases.

Individuals can use this technology to minimize time spent watching television. Items not of interest can be filtered out. Program transcripts can be captured and perused with only the desired video and audio being played back.

The invention also provides other multimedia applications and databases with access to fully indexed video, audio and closed captions from broadcast television.

The invention also provides a multimedia computer system, comprising a central processing unit; a video capture unit for receiving broadcast television signals and generating a video signal therefrom; a video display unit capable of displaying said video signals under program control; means for decoding data signals embedded in said television signals and generating a program data stream representative of program content of said television signals and changing dynamically therewith; means for inputting criteria identifying program content of interest to a user; a database for storing data representing said criteria; means for storing a program segment and the program data stream associated therewith while maintaining synchronism between the program data stream and the program segment; display means permitting the user to examine a portion of a stored program segment by selecting a portion of the dynamic program data stream corresponding thereto; and said central processing unit being programmed to continually compare the program data with said stored data and to store a program segment when said program data matches said stored data.

The invention still further provides a method of monitoring broadcast signals, comprising the steps of extracting program signal streams from said broadcast signals; generating from the broadcast signals a program data stream separate from said program signal streams, said program data stream being representative of program content and changing dynamically therewith; comparing said program data stream with stored data identifying program content of interest to the user; storing, when said generated program data stream matches said stored data, a program segment and the program data stream associated therewith while maintaining synchronism between the program data stream and the program segment; and examining a portion of a monitored program associated with said matching program data stream by selecting a portion of the dynamic data stream corresponding thereto.

The invention additionally provides a computer-readable storage medium having binary information encoded thereon, said binary information being operable when interpreted by a computer to direct the computer to monitor broadcast signals and generate program signal streams to permit the presentation of program material carried by the broadcast signals to a user, analyze incoming broadcast signals to generate a program data stream separate from said program signals, said program data stream being representative of their program content and changing dynamically therewith, compare said data stream with stored data identifying program content of interest, and store, when said generated data matches said stored data, a program segment and the program data stream associated therewith while maintaining synchronism between the program data stream and the program segment to permit the user to examine a portion of a monitored program associated with said matching program data stream by selecting a portion of the dynamic data stream on a display means.

BRIEF DESCRIPTION OF THE DRAWINGS

The invention will now be described in more detail, by way of example only, with reference to the accompanying drawings, in which.

DESCRIPTION OF THE PREFERRED EMBODIMENTS

Figure 1:
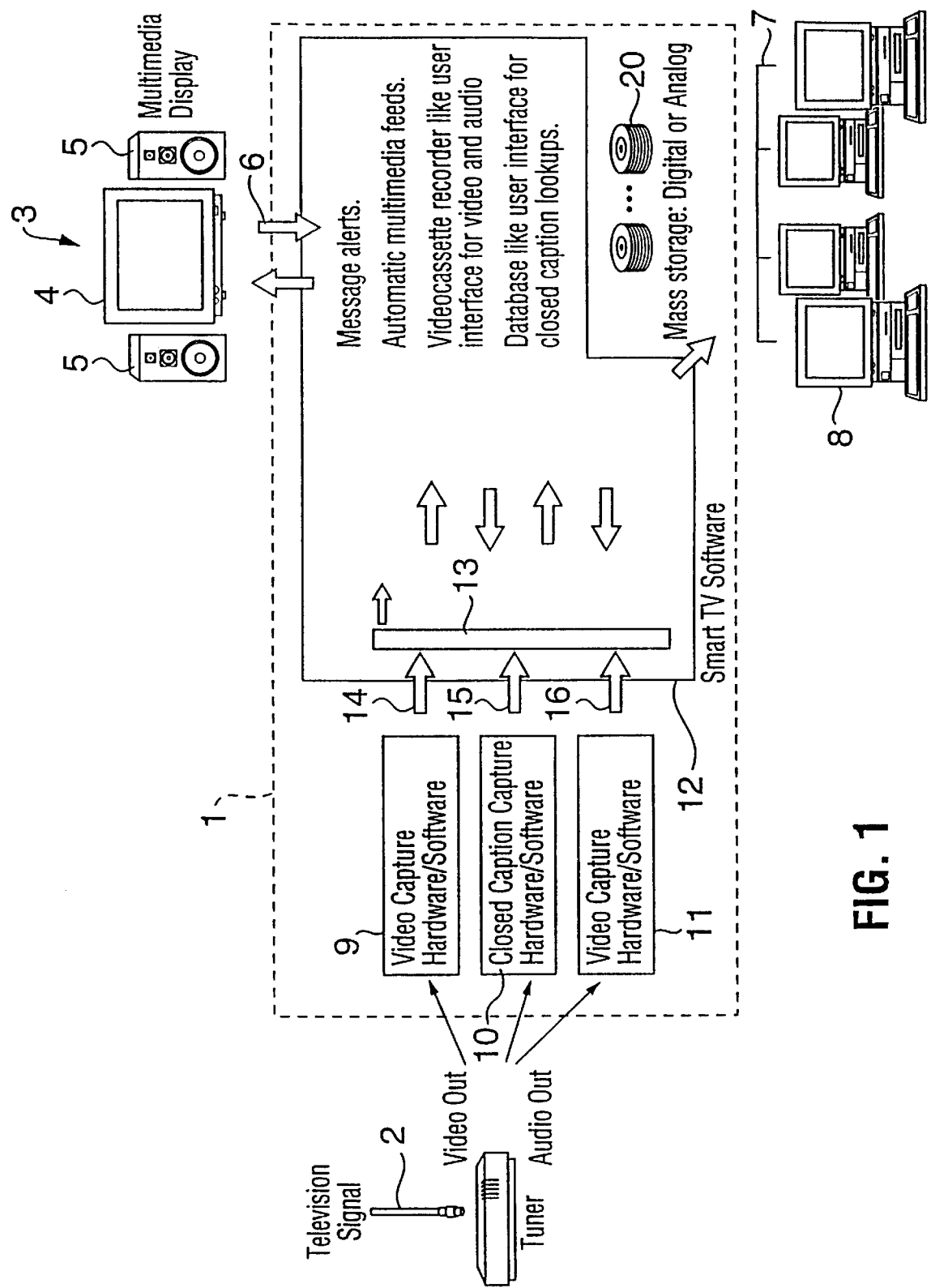
FIG. 1 is a block diagram of a system in accordance with the invention showing the overall system architecture.

In FIG. 1, a monitoring system 1 in accordance with the invention receives a standard broadcast television signal from a tuner 2. The system is connected over a bi-directional link 6 to a multimedia display 3 consisting of a personal computer including a CRT monitor 4 and speakers 5. The multimedia display can form part of a conventional multimedia PC set-up. The system 1 can also be connected to a network 7, which in turn is connected to individual workstations 8.

The monitoring system 1 comprises a video capture unit 9, a closed caption capture unit 10, and an audio capture unit 11. Such units are per se commercially available. Data streams 14, 15, 16, which are preferably digital although they could be analogue, from these units are passed to bus 13 of unit 12, shown in more detail in FIG. 2. Unit 12 carries out several functions as follows:

Video, audio and closed Caption data streams are synchronized and tagged for time of arrival.

Users are alerted to program content by continuous checking of the closed caption text stream.

Video, audio and closed captions are saved to disk storage. The video and audio clips can be retrieved by word or phrase using the closed captioned text and the synchronizing tags that index the video and audio. The Video, audio and closed caption text might be saved to disk continuously but the recording of the data can also be based on content. For example, the system might be instructed to start recording video, audio and closed caption data from 30 seconds before (using a delayed feed buffer) to 5 minutes after the appearance of a keyword in the closed caption stream. This is significant since continuous storage of video data imposes huge storage requirements.

Clients on the network 7 can receive alerts, multimedia feeds and perform queries as shown on the multimedia display above.

In operation, the user enters data either through, for example, a LAN-connected PC 8 or the workstation 3. For example, the user might enter a series of key words representing topics of interest. These key words are then entered into a profile database in mass storage device 20 along with the identity of the user. When the selected key words appear in the closed caption data stream, the system generates an alert signal to alert the user. For example, the system might be set to trigger an alert if the words CLINTON and YELTSIN occur within an adjacent stream of twenty words. In a simple case, the alert may, for example, involve turning up the sound on the monitor 4. If desired, the system can also employ fuzzy logic principles to find similar words, for example, synonyms of the words entered by the user. This arrangement also copes with mis-spellings, which are quite common in closed caption systems.

Each user connected to the system can of course enter his or her own customized search profile.

Figure 2:
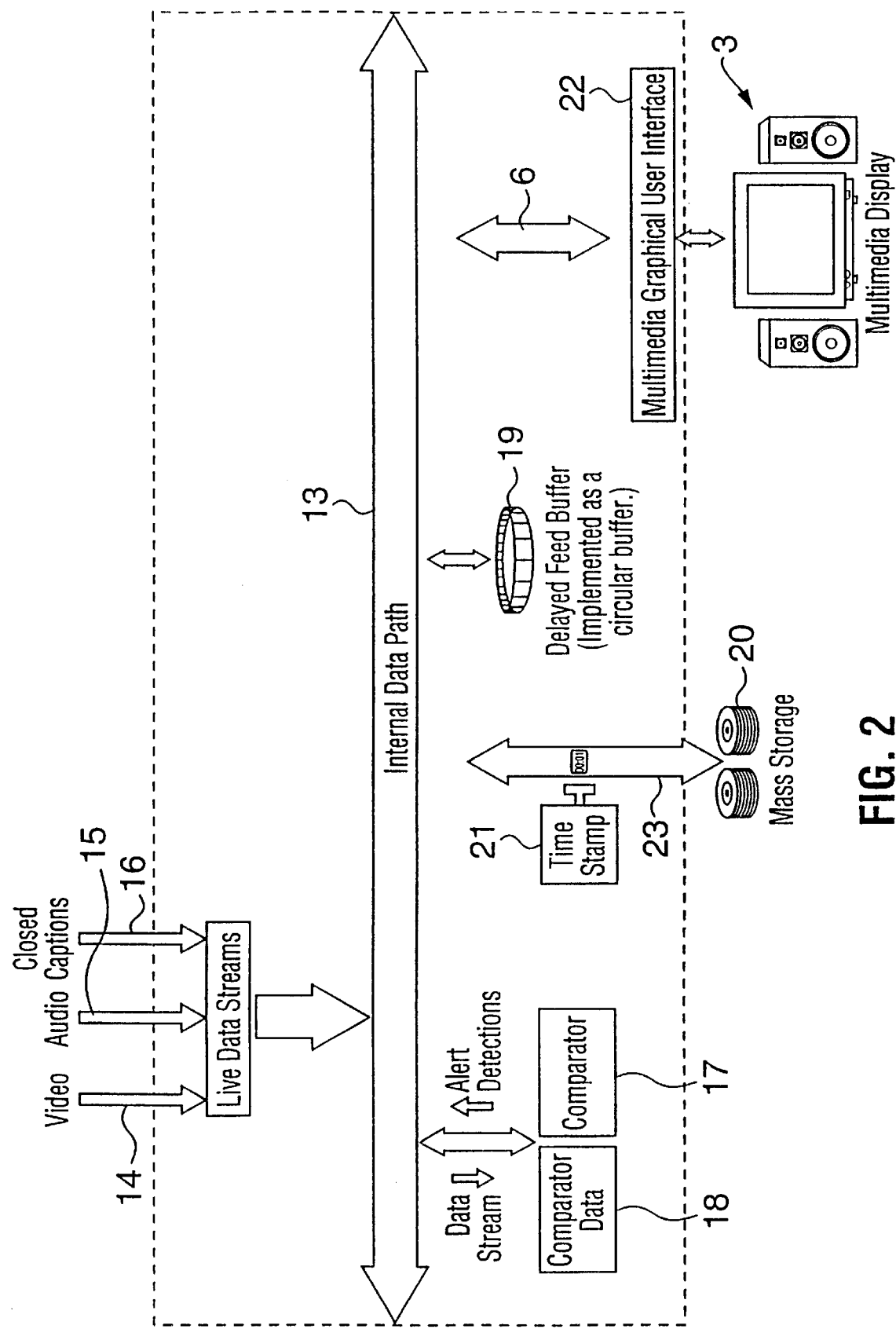
FIG. 2 is a block diagram showing the internal architecture of the system shown in FIG. 1.

Referring now to FIG. 2, when the system is monitoring the broadcast signals, the incoming data streams 14, 15, 16 are passed over internal bus 13 to comparator 17, which compares the data with comparison data stored in a profile database 18 set-up by the user in mass storage unit 20. Database 18 stores the data entered by the user through the multimedia PC 3. For example, the user may have chosen a set of keywords and phrases to look for in the closed caption data stream. These are entered through multimedia PC 3 and stored in the database 18.

The incoming data streams, or as noted above selected portions of them, are stored in mass storage device 20 along with a time stamp added by time stamp unit 21. Storage device 18 may be analogue, although it is preferably digital to allow random access to the information.

Through PC 3, the user can also set up other actions for the system to perform when a keyword or phrase is found. These actions include sounding a beep, activating a remote beeper, opening a video window, sending electronic mail—essentially any action the computer can be programmed to perform. Also the system can automatically create a profile, (or comparator database), from an existing database, spreadsheet or word processor file, that can be used for monitoring. The system creates this profile by searching the specified files for proper nouns, categories and pre-defined keywords. After retrieving these from the specified file, they are presented to the user for modification.

Each user 8 on the network can also add, delete, and modify the database profile 18 over the network 7 to customize it for his individual requirements.

When system is storing data, the closed captioned text is stored in a standard text database in the mass storage unit 20. There are at least two columns in the database, namely the captured phrase and the absolute time it was captured. The audio stream and video streams are also captured together with their absolute start time. Individual sections of video and audio can be retrieved using SQL-like queries on the closed captioned text. The associated video and audio are retrieved using absolute time returned from the text query. The system will position to the exact time within the video and audio that the word or phrase occurs at.

The system also has a delayed feed buffer 19, implemented as a circular buffer. This stores that last n minutes of each of the data streams. The user can specify the length of this buffer and each of the three data streams can have different lengths. This buffer 19 also provides the user with the ability to backup a few seconds or minutes when an alert is received. Using technology known per se, the delayed feed buffer can also be played back at double speed so that the user can catch up to the live broadcast.

The system provides the ability to distribute video, audio and text in whole or in part. Lower speed systems may choose only to receive the closed captioned text of a program, or just the audio.

A specific example of the use of the monitoring system is as follows: A television viewer wants to watch the movie "Gone With The Wind". The viewer sets the computer to beep when the words "I don't give a damn" are spoken. Alternatively, having stored the same movie with this technology, they could position directly to the scene where those words are spoken, without having to know where in the movie, by time or relative position, these words occur. The user interface for positioning to the words or phrases of interest is very similar to a word or phrase search in a word processor, or an SQL query.

The system in the embodiment described monitors the incoming closed captioned text stream, synchronizes it with the incoming video and audio, and alerts the user to topics of interest. When an alert happens, programmable actions, such as sounding a beep and/or bringing up a video window, occur. The incoming video, audio and closed caption text are stored with time based tags and indexes, creating a fully indexed multimedia database automatically.

Users have an SQL-like query capability on closed caption text with an ability to retrieve associated portions of video and audio. They can configure the monitoring software for particular words, phrases or general content, and perform particular actions upon alerts.

The video, audio and closed captioned text can be distributed on the computer network 7, either directly or through electronic mail. The system and network managers can be provided with an ability to manage the system and network resource usage.

Figure 3:
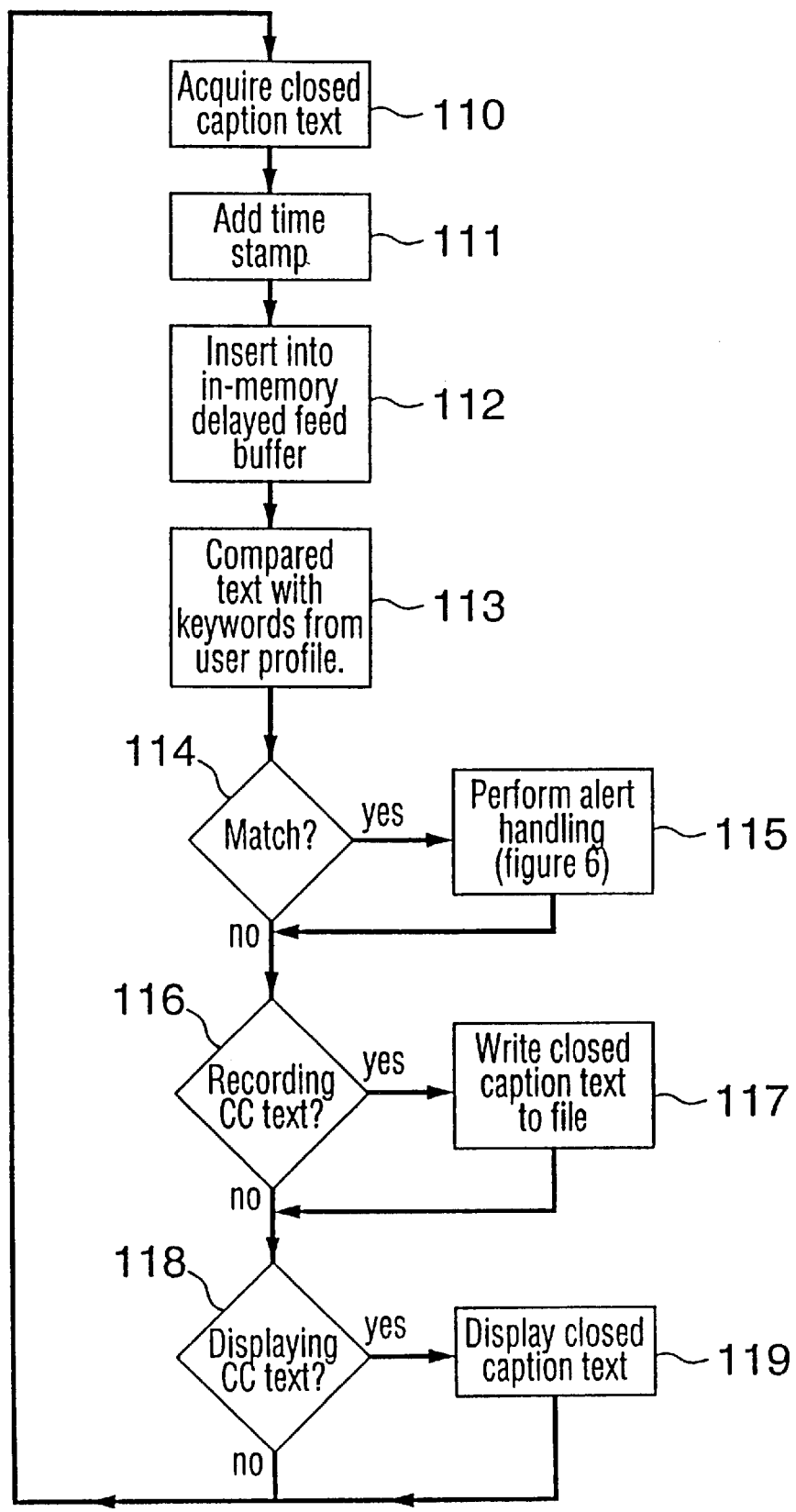
FIG. 3 is a flow chart showing the closed caption stream processing.

FIG. 3 shows the processing of the embedded data stream, which in this embodiment constitutes the closed caption stream. The text is first acquired in unit 110 and after insertion of a time-stamp in unit 111 inserted into the delayed feed buffer 19, after which is compared to comparator 113 for comparison with words from the user profile stored in storage unit 20. If a match is found, decision unit 114 activates alert handling unit 115 (shown in more detail in FIG. 6).

In the absence of a match, decision unit 116 determines whether the closed caption text is to be recorded in accordance with user instructions. If yes, the closed caption text is written to file in unit 117; if not, unit 118 determined whether the text is to be displayed in closed caption display 119.

Figure 4:
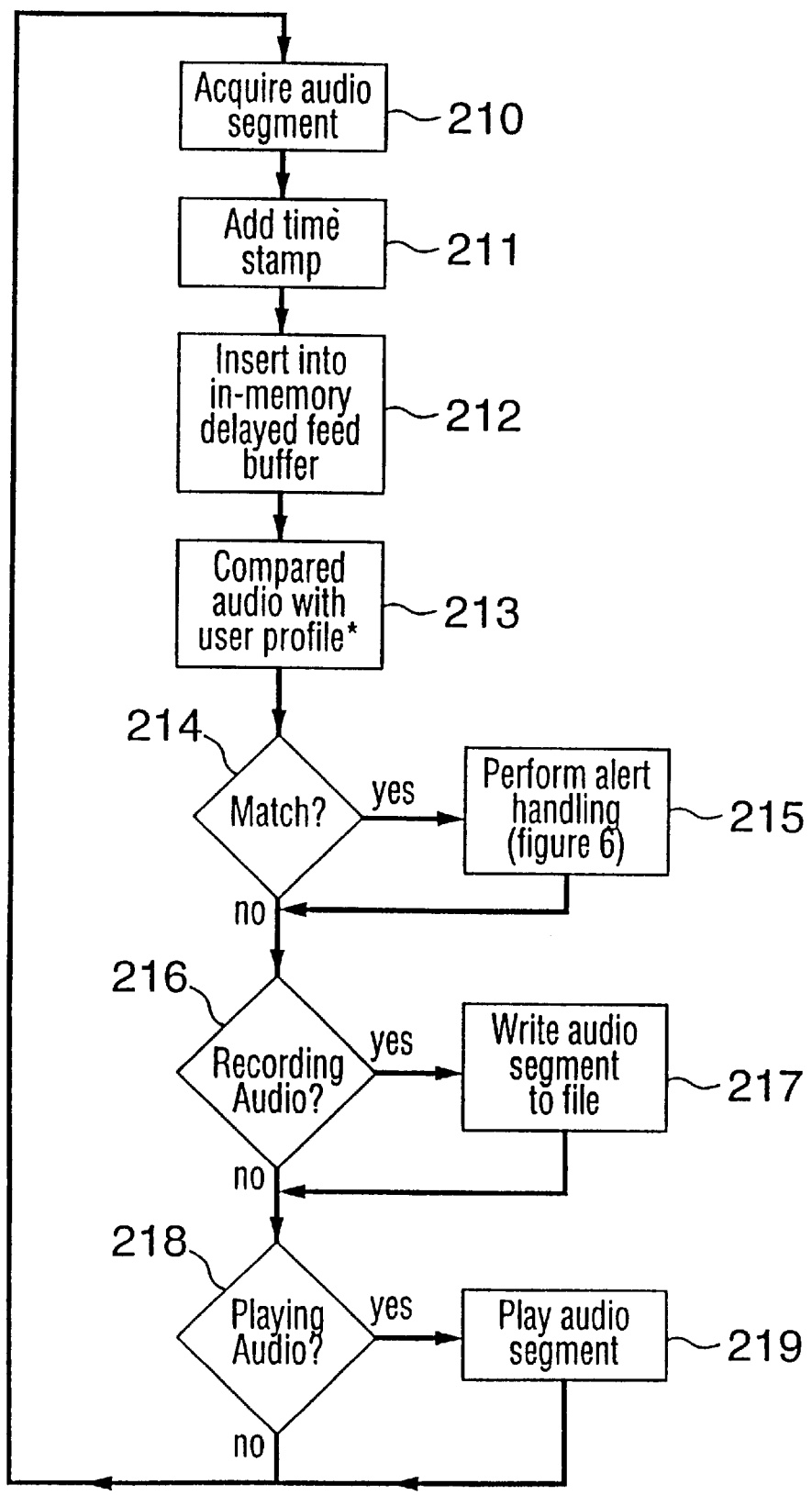
FIG. 4 is a flow chart showing audio stream processing.

FIG. 4 is a flow chart similar to FIG. 3 for pattern matching based on audio, which is treated separately from the video. Audio units 210 to 219 operate in a similar manner to units 110 to 119 in FIG. 3 except for the fact that the pattern matching is achieved by extracting text from the audio stream using voice recognition techniques.

Figure 5:
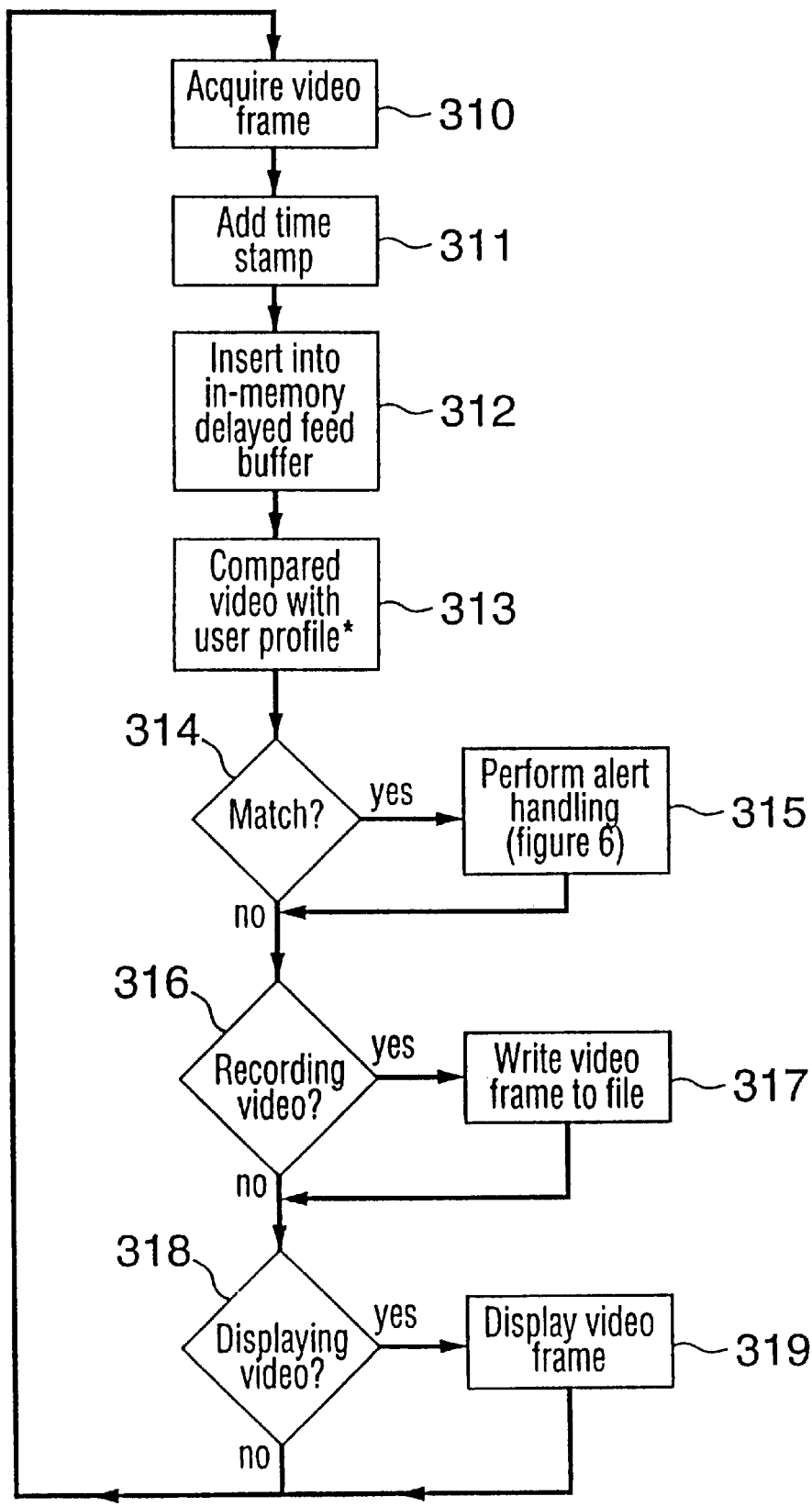
FIG. 5 is a flow chart showing video stream processing.

FIG. 5 is a flow chart similar to FIG. 3 for pattern matching based on video, which is treated separately from the audeo. Video units 310 to 319 operate in a similar manner to units 110 to 119 in FIG. 3 except for the fact that the pattern matching is achieved by extracting text from the video stream using pattern recognition techniques or by analyzing color histograms, for example.

Figure 6:
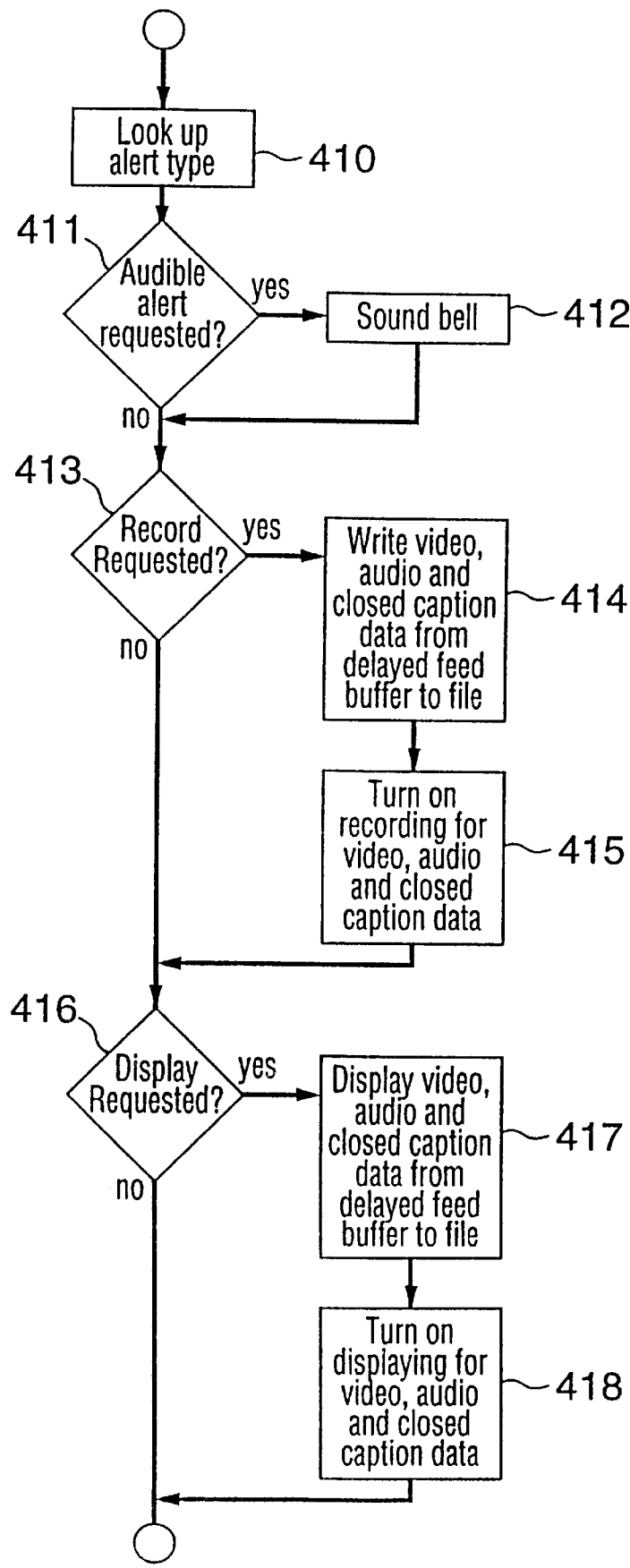
FIG. 6 is a flow chart showing the alert handling procedure.

FIG. 6 shows how alerts are handled. When an alert occurs as a result of a pattern match, unit 410 identifies the alert type. If an audible alert has been requested, decision unit 411 sounds bell 412.

Decision unit 413 determines whether a recording has been requested, and if so causes unit 414 to write video, audio, and closed caption data from delayed feed buffer 19 to be written to a file on mass storage unit 20. Unit 415 causes the recording of incoming video, audio, and closed caption data to be commenced.

Decision unit 416 determines whether a display has been requested, and if so unit 417 causes unit 418 to start displaying the video, audio and closed caption data.

Figure 7:
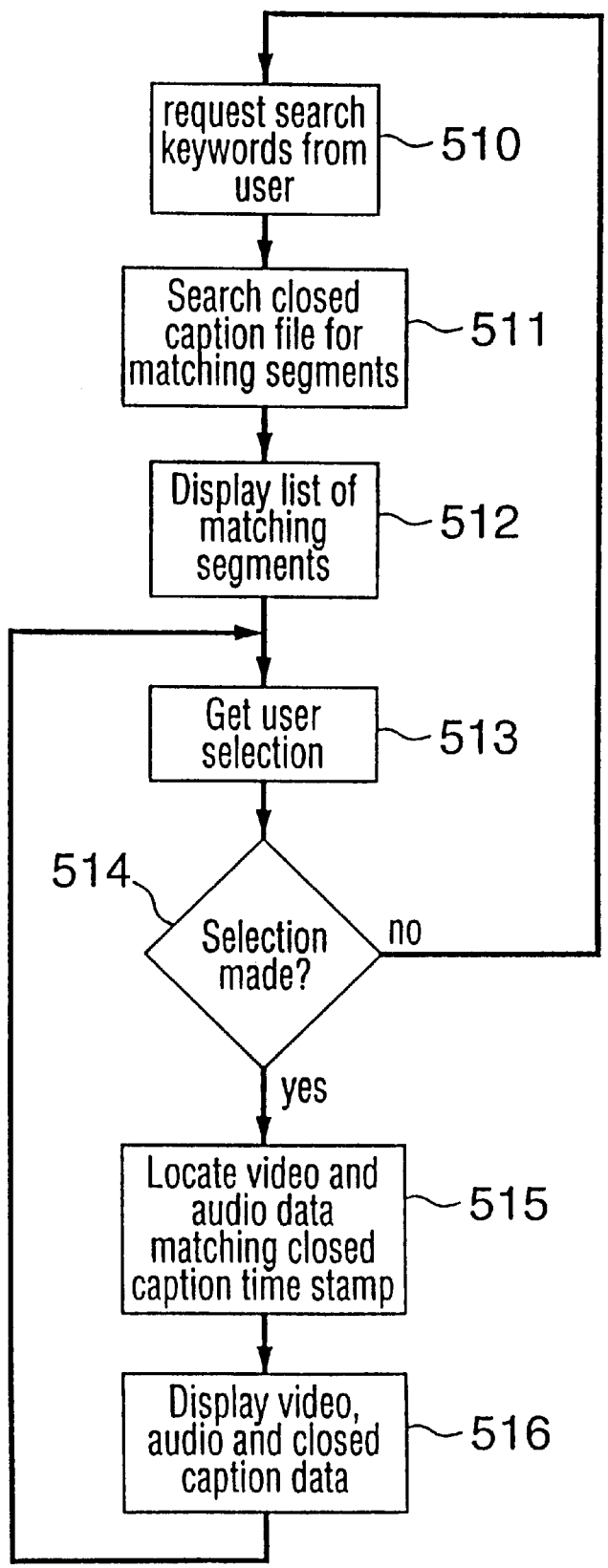
FIG. 7 is a flow chart showing the stored data processing.

FIG. 7 illustrates the stored data handling. One or more keywords are first requested from the user by unit 510. The user enters the keywords through the computer keyboard.

Unit 511 searches the closed caption file for matching keywords and unit 512 displays a list of matching segments. Unit 513 requests a user selection. Decision unit 514 returns control to the request unit 510 if no selection is made; otherwise unit 515 locates the matching segment, which is then displayed by unit 516.

Figure 8:
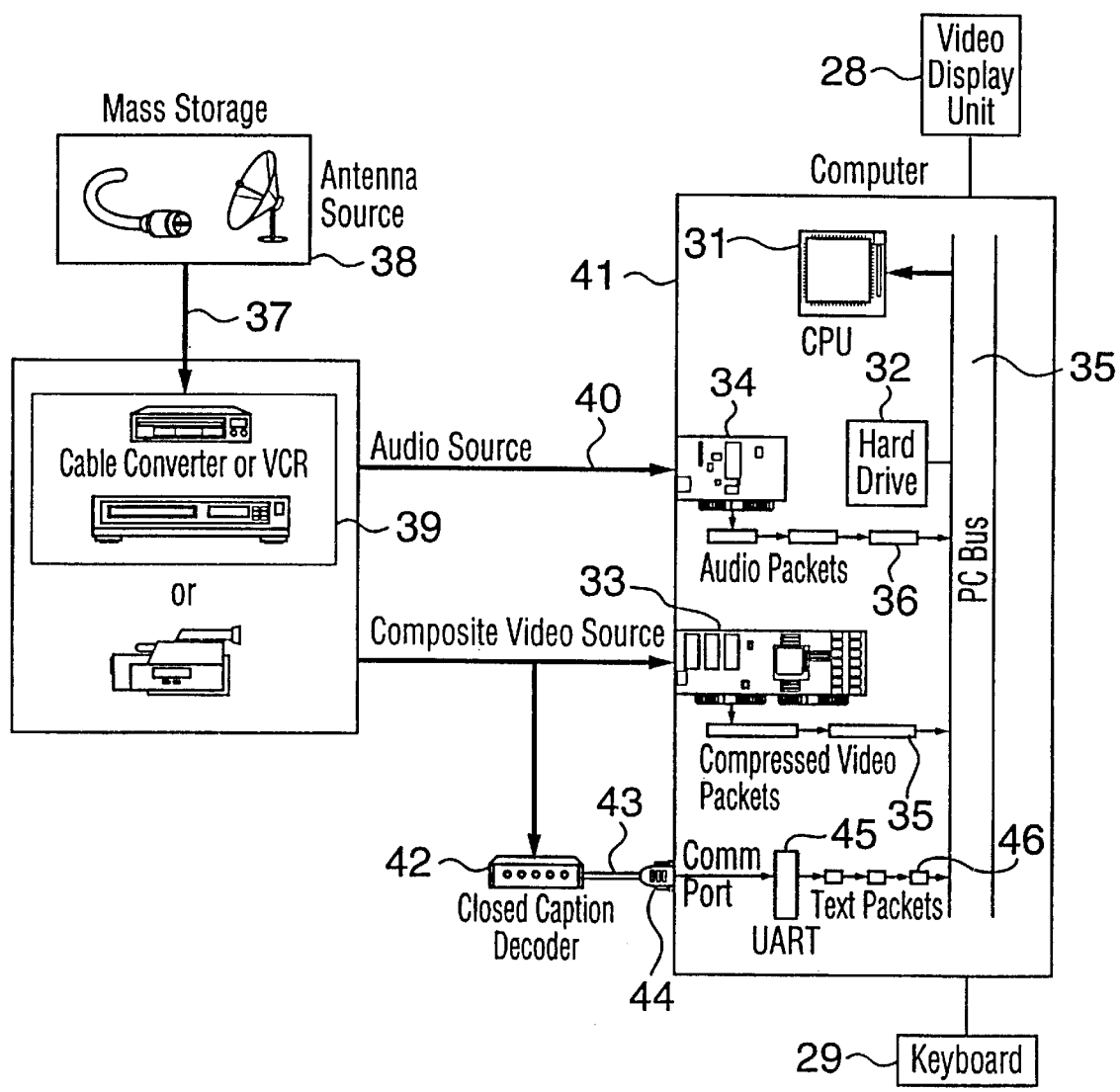
FIG. 8 is an embodiment of the invention based on a standard stand-alone multimedia personal computer.

A system in accordance with the invention can conveniently be implemented as a stand-alone system on a personal computer running a Windows™ operating system as shown in FIG. 8. Personal computer 30 includes at least a 486 DX66 and preferably a 90 MHz Pentium or higher microprocessor 31 on the motherboard and a hard drive 32 with preferably at least one gigabyte of storage space connected to PC bus 350. A Creative Labs Video Blaster™ video capture card 33 is located in one of the expansion slots of the motherboard. A suitable 16-bit sound card 34, such as a Soundblaster™, is located in a second expansion slot. The personal computer 30 is connected to a conventional video display unit 28 and keyboard 29.

The video card 33 and sound card 34 send respective compressed video packets 35 and audio packets 36 to the PC bus 35.

Incoming rf television signals 37 from a cable or antenna source 38 are fed to a cable converter or VCR which demodulates the incoming rf signals and generates an audio stream 40, which is fed to the sound card 34, and a video stream 41, which is fed to the video card 33.

The video signals 41 are also fed to a Sunbelt TextGrabber™ closed caption decoder 42. This decodes the closed caption signals embedded in the vertical blanking interval and sends an ASCII text stream to the PC bus 35 through the serial port 44 and UART 45, which created text packets 46.

The user enters instructions through the keyboard 29 with the assistance of dialog boxes and a mouse (not shown) in a customary manner.

Figure 9:
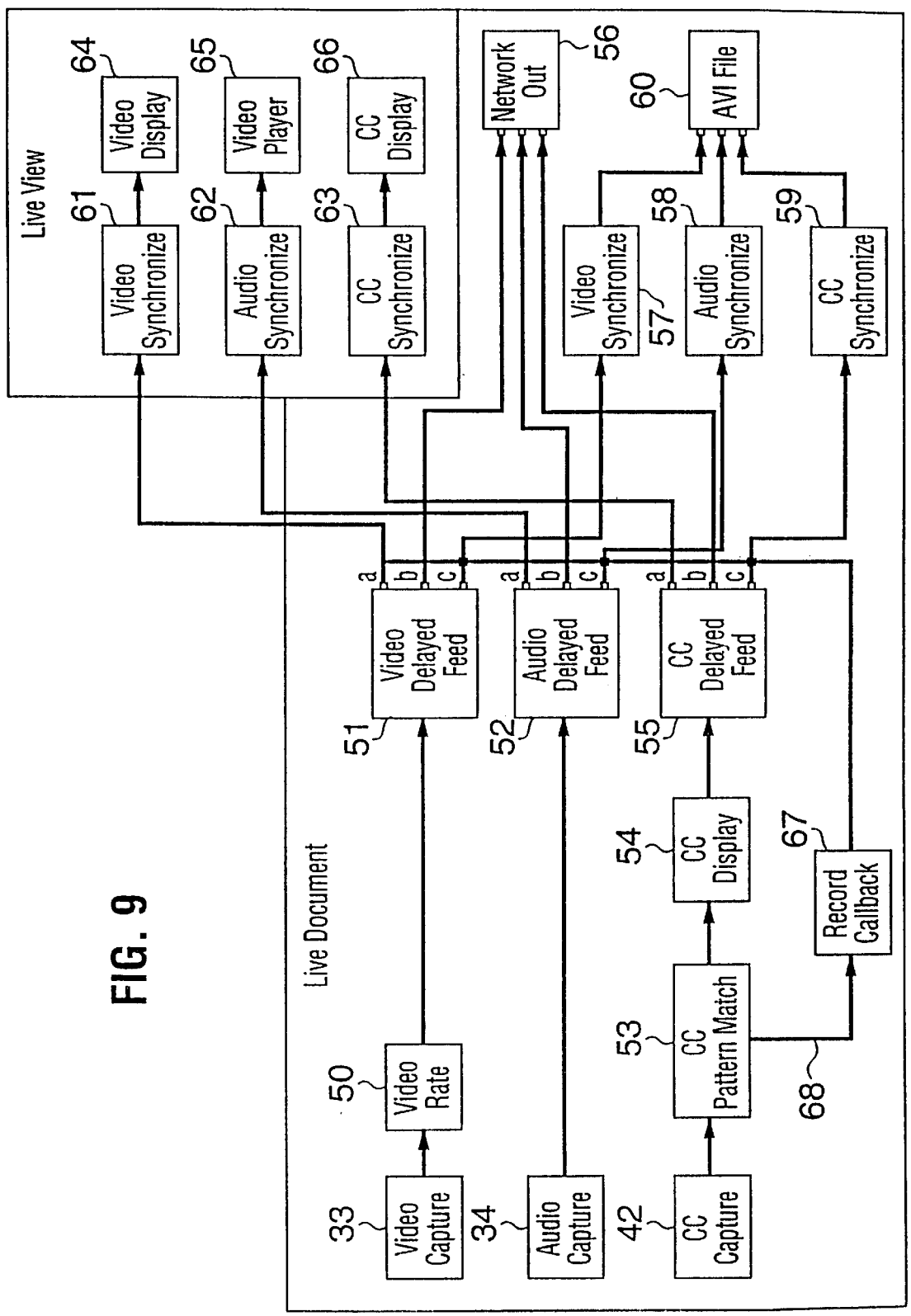
FIG. 9 is a functional block diagram of a live feed arrangement for the embodiment shown in FIG. 8.

FIG. 9 shows in more detail the processing of the signals in the personal computer 30. The video signals are passed through rate controller 50, which measures the frame rate in accordance with user instructions, to video delay unit 51. The audio signals are passed directly from audio capture unit 34 to audio delay unit 52. The closed caption signals are passed through closed caption pattern matching unit 53, which looks for pattern matches with the stored data representing the selected criteria, and closed caption display unit 54 to closed caption delay unit 55. Caption pattern unit 53 can carry out pattern matches on the basis of Boolean combinations of keywords entered by the user through the keyboard 29. For example, the pattern matching circuit 53 might trigger an event if two selected words occur within a stream of twenty adjacent words. The closed caption display unit 54 permits the user to view the closed caption text directly in a window on the video display unit 28 under program control.

The delay units 51, 52, 55 serve as buffers that hold the respective incoming signals for a time that can be selected by the user, for example 10 seconds or 20 seconds. This allows the user to either replay a portion of program material that has just been broadcast or to arrange for the computer to store not only a predefined segment of program material after detection of a pattern match, but also a segment prior to finding a match. For example, a typical set-up may be to store the previous ten seconds and the following twenty seconds after a pattern match. Each delay unit 51, 52, 55 has three output ports a, b, c.

The video delay unit 51, audio delay unit 52, and closed caption delay unit 55 are connected through port b to a network interface 56 for the distribution of captured material over a network, such as a local area network.

The above units are also each connected through port c to a synchronizing unit 57, an audio synchronizing unit 58 and a closed caption synchronizing unit 59. These three units 57, 58, 59 create an AVI (Audio-Video interleaved) file 60 on hard disk 32, which contains a video clip consisting of video, audio and associated closed caption data.

The units 51, 52, and 55 are also connected through port a to additional synchronizing units 61, 62, 63 connected respectively to a video display generator 64, a sound generator 65 in audio card 34, and a closed caption display generator 66. The video and closed captioning thus appear in a window, with the video (and audio) synchronized to the closed captioning.

When a pattern match is detected by the unit 53, a signal 68 is sent to the record callback unit 67. This causes one or more of several predetermined actions to take place depending on the mode selected by the user. The record callback unit activates ports a, b or c of delay units 51, 52, 55 to cause the delayed feed to be sent to the live display through units 61, 62, 63, the network 56, or the AVI file 60 through units 57, 58, 59. Instead of being stored in a computer file, the video and audio (and possibly closed caption stream) could be stored on a VCR tape. The ports can access the buffered signals at any time point in the buffers depending on the user setting.

Figure 10:
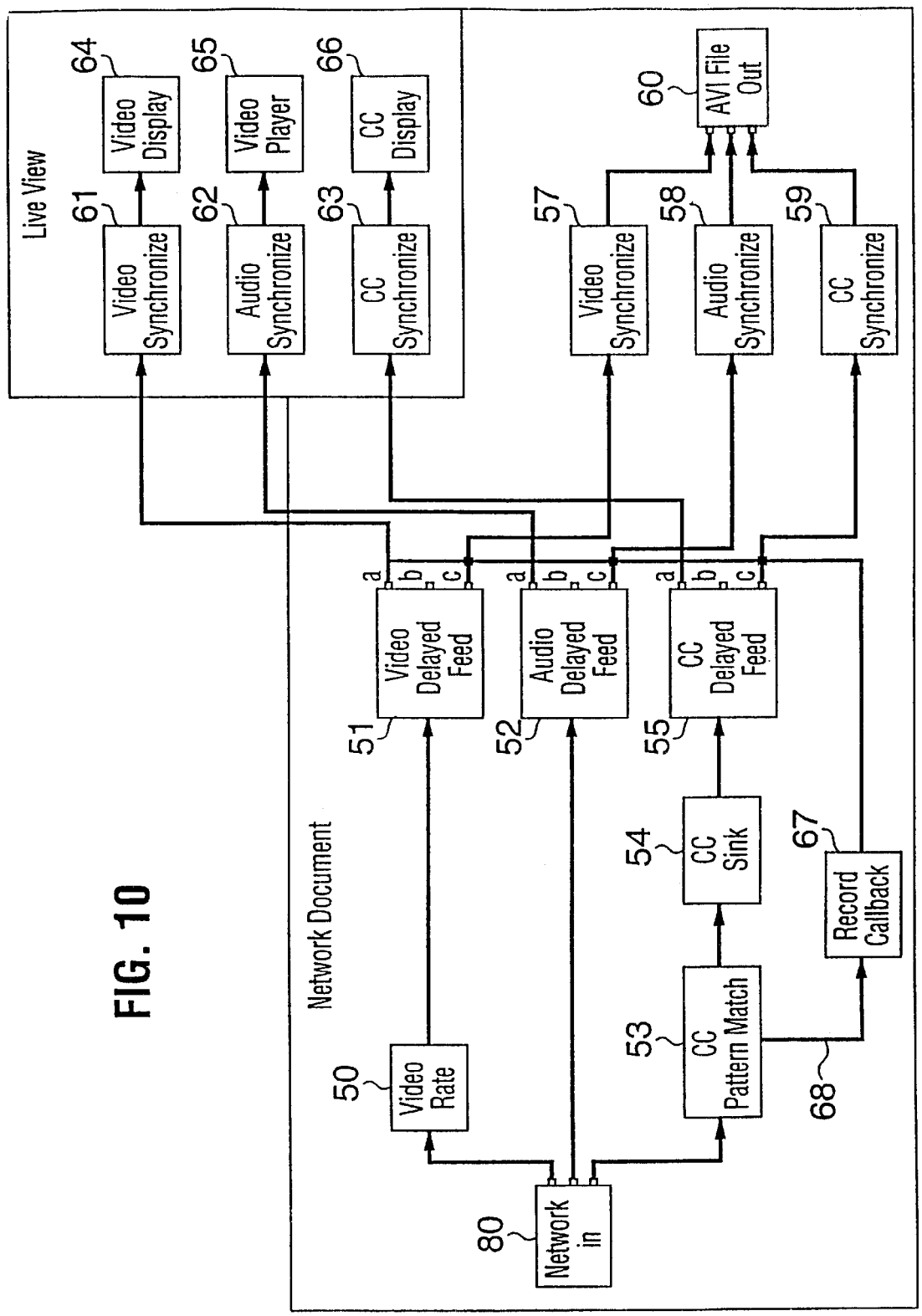
FIG. 10 is a functional block diagram of a network feed arrangement.

FIG. 10 shows an arrangement where the computer receives a feed from a local area network (LAN). In this case the incoming broadcast signals are received by a network server, digitized and transmitted to the clients on the network. The network provides signals equivalent to the capture units 33, 34, 42. The rest of the system remains the same. In this embodiment, only the server requires a video card and closed caption capture unit. The clients receive the digitized signals, including video, sound, and closed captions over a network interface, such as SMC EtherEZ.

Figure 11:
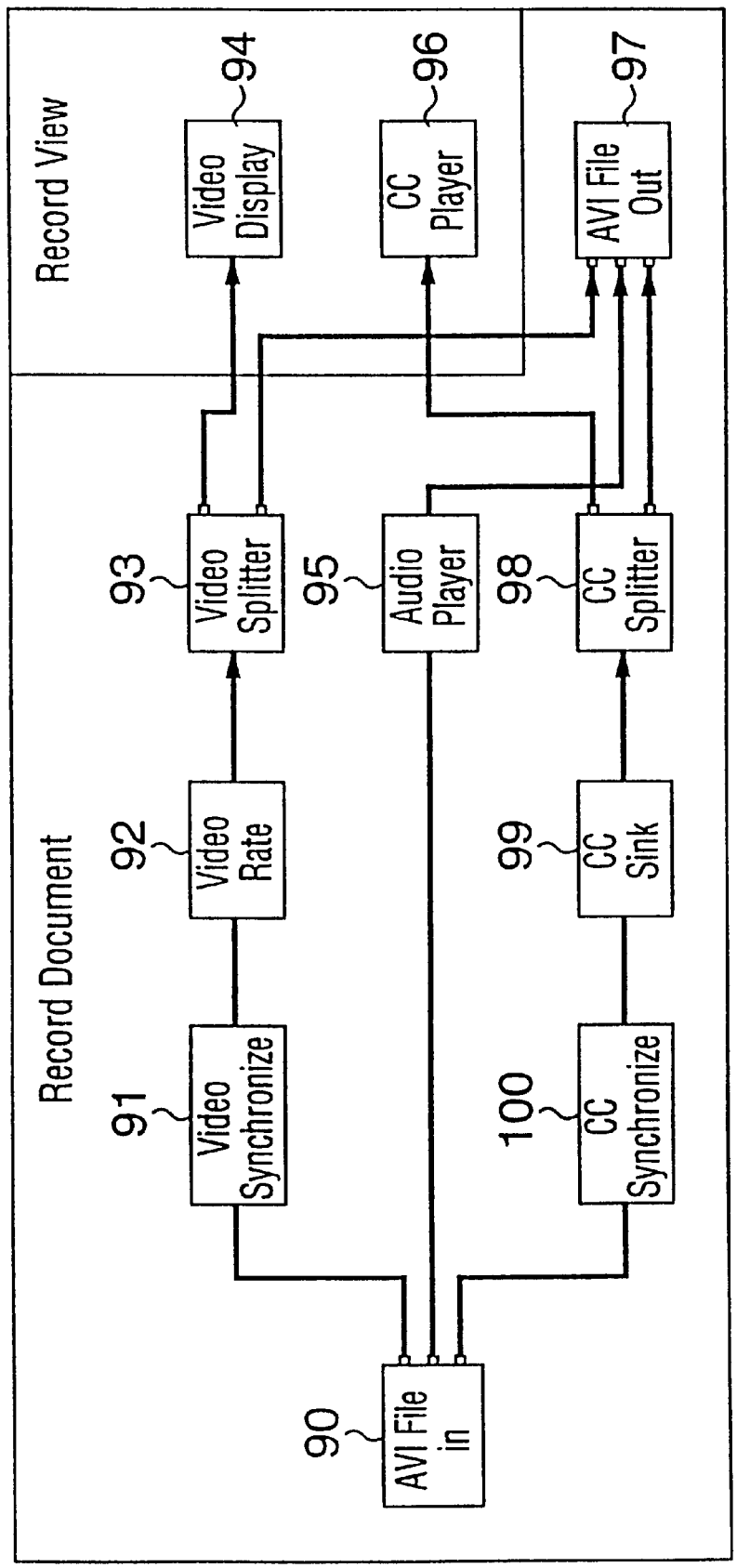
FIG. 11 is a functional block diagram of an arrangement for playing back or re-recording a video segment.

In FIG. 11, an AVI file is received by unit 90 and the audio extracted in unit 95. The video is sent through video synchronizer 91, rate monitor 92 and video splitter 93 to video display 94 and output AVI file 97. The closed caption stream is sent through closed caption synchronizer 100, closed caption sink 99, which extracts closed caption text for continuous display, closed caption splitter 98, from where it is passed to closed caption display 96 and AVI output file 97. The units 94 and 96 allow the video to be displayed along with its associated closed caption text. The output file 97 allows the user to edit and re-record portions of the stored text.

Figures 12, 13:
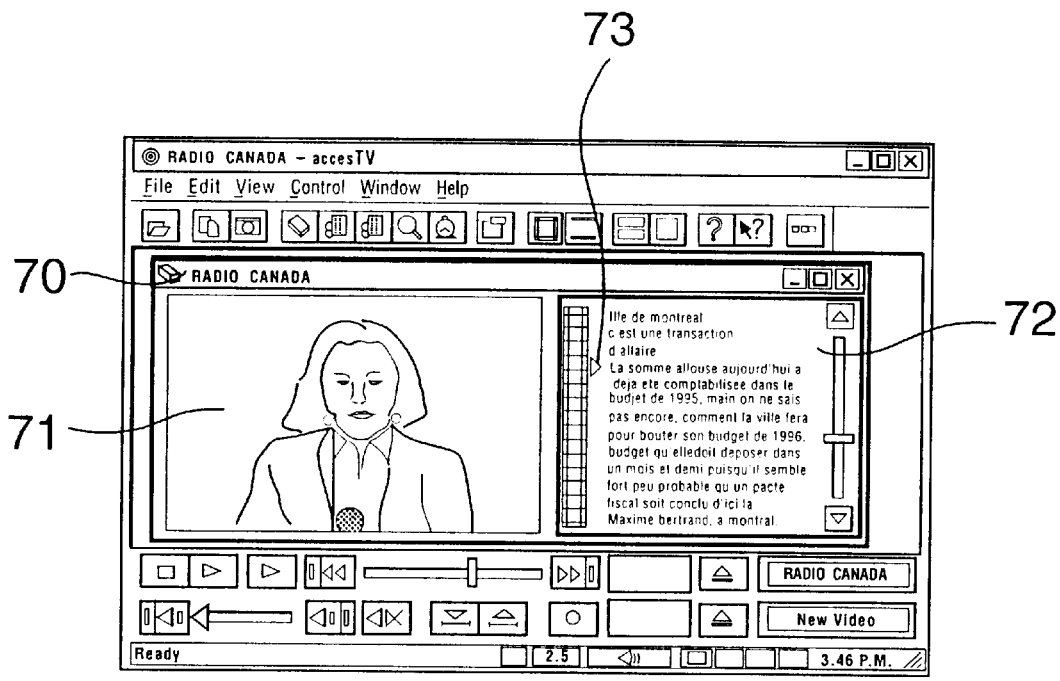
FIG. 12 shows a typical display screen.
FIG. 13 shows a typical display screen showing a program listing.

FIG. 12 shows a typical display screen running in an active window 70 on visual display unit 28. Video segment 71 is playing along with its associated audio. Beside the video segment 71 is the closed caption text 72. Pointer 73 indicates the portion of text related to the current image 71. The pointer 73 can be dragged up and down with the mouse to cause the video corresponding to the indicated text to be played.

FIG. 13 shows a window displaying a listing of recorded video clips. Double clicking on any of the items listed causes the item to appear in an active window along with the associated text for playback, which can be initiated using a Windows™ style control bar.

The system can be programmed to watch multiple channels simultaneously. In this case each channel has its own processing system as described with reference to FIG. 9.

Figure 14:
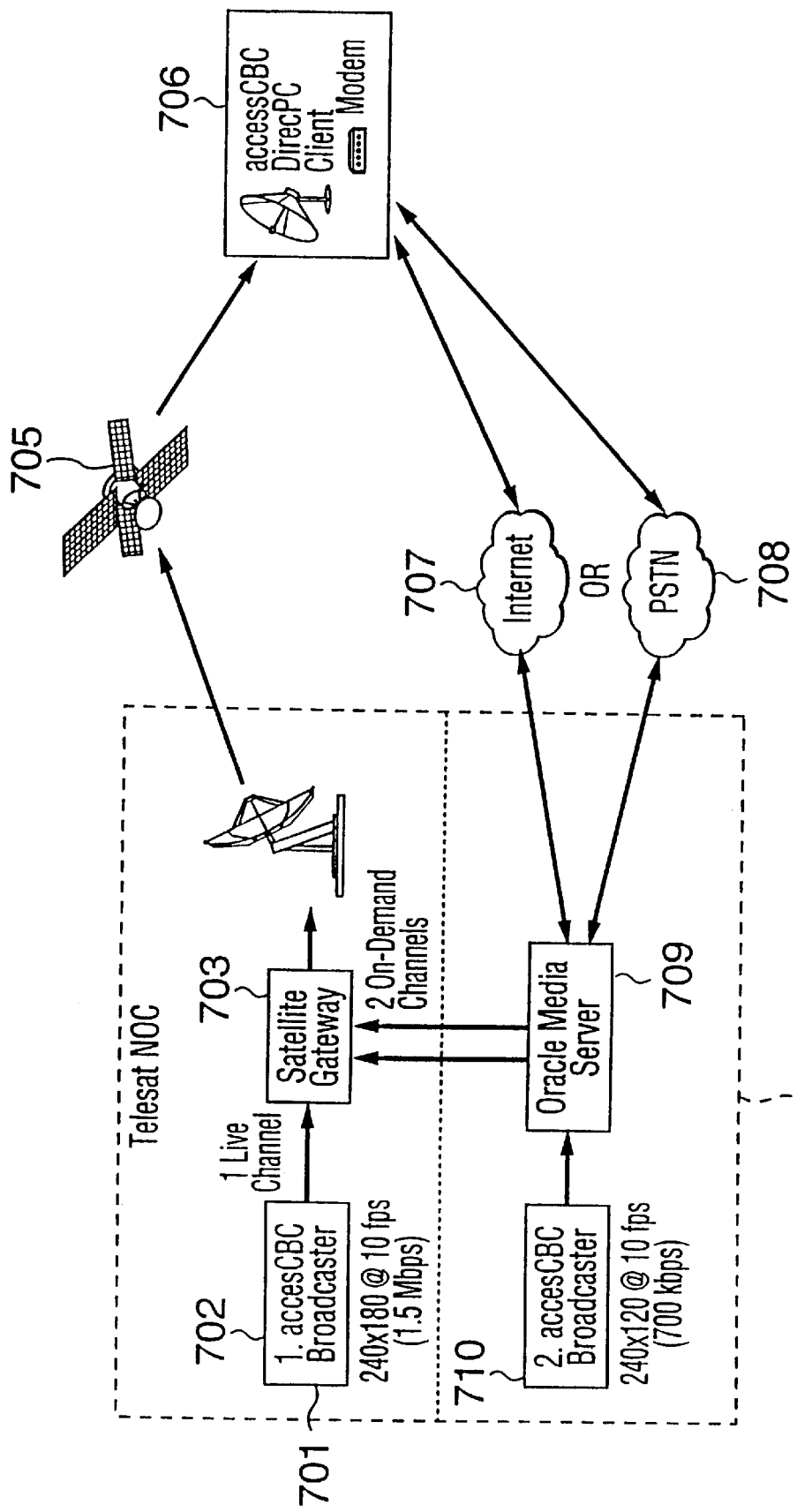
FIG. 14 is a block diagram of another embodiment of the invention applicable to an on-demand architecture.

In the embodiment of FIG. 14, block 700 contains a monitoring system as described above and outputs digital signals for distribution over a remote network. This is achieved by feeding the signals through satellite gateway 703 to satellite antenna 704, which sends them via satellite 705 to any one of a series of clients, such as 706. The clients 706 are connected back to the block 700 via the internet 707 or the public switched telephone network 708. The client 706 can use a service known as DirecPC, which provides a wide bandwidth downlink, for example, to the internet, with the uplink being provided through a conventional modem.

Unit 702 receives broadcast signals 701, for example from air or over a cable. These can be conventional analogue signals, or alternatively they can be digital signals, for example in MPEG format. The unit 702 receives instructions from client 706 over the network. When a pattern match is achieved, it sends the program signals over the network to the client 706.

The system described in FIG. 14 effectively acts as a network, with the unit 700 being the network server.

In a further enhancement, the client 706 is connected back to a media server 709, which permits access to "on-demand" channels. A second monitoring system 710 can be provided, if desired, both units 706 and 710 being controllable by the clients 706.

The described system thus has the advantage that it offers instant alert to events as they occur. Television feed can be automatically organized as it is stored; i.e., closed caption text is synchronized with the incoming video and audio. This provides the ability to automatically create a multimedia database from which items can be retrieved based on content, such as spoken words, and the ability to retrieve video and audio segments with word or phrase resolution. A stored video feed can be retrieved based on new information;

h) display means having a first window for displaying and laying back video frames of said stored program segment and a second window for displaying said dynamic pprogram data stream;

i) means for identifying a portion of said displayed data stream corresponding to a displayed frame and permitting the user to select a portion of the dynamic program data stream corresponding to a portion of interest of said stored program segment and thereby cause video frames corresponding to said ortion of interest to be played back in said first window; and said central processing unit being programmed to continually compare the program data with said stored data and to store a program segment when said program data matches said stored data.

The synchronized video, audio and closed captions can be distributed over computer networks.

The invention also offers a much lower cost due to the elimination of manual intervention, and a reduction of raw information flow, resulting in less network congestion.

We claim:

1. A system for monitoring broadcast television signals, comprising:
   a) means for receiving the broadcast television signals and generating program signal streams to make available programs carried by said broadcast television signals;
   b) user-operable selection means for inputting criteria identifying program content of interest to a user;
   c) a database for storing data representing said criteria;
   d) recognition means for generating from said broadcast television signals, for each program stream, a program data stream separate from said program streams, said program data stream being representative of program content and changing dynamically therewith;
   e) means for synchronizing said program data stream to said program signal streams;
   f) a comparator for comparing said program data stream with said stored data,
   g) means for storing, when said program data stream matches said stored data, a program segment and the program data stream associated there with while maintaining synchronism between the program data stream and the program segment;
   f) display means having a first window for displaying and playing back video frames of said stored program segment and a second window for displaying said dynamic program data stream; and
   g) means for identifying a portion of said displayed data stream corresponding to a displayed frame and permitting the user to select a portion of the dynamic program data stream corresponding to a portion of interest of said stored program segment and thereby cause video frames corresponding to said portion of interest to be played back in said first window.

2. A system as claimed in claim 1, wherein said recognition means decodes data signals embedded in said broadcast television signals to produce said program data stream.

3. A system as claimed in claim 2, wherein said embedded data signals comprise a closed caption text stream.

4. A system as claimed in claim 1, wherein said recognition means comprise audio recognition means for analyzing audio content of the broadcast signals.

5. A system as claimed in claim 1, wherein said recognition means comprise pattern recognition means for analyzing video content of the broadcast signals.

6. A system as claimed in claim 1, wherein said program segments are indexed on the basis of said program data stream.

7. A system as claimed in claim 1, further comprising video and audio capture devices for generating respective video and audio signals providing said program signal streams.

8. A system as claimed in claim 1, further comprising means for tagging the stored program signals with the time of broadcast.

9. A system as claimed in claim 1, further comprising a device for generating an alert signal to alert the user to the presence of program content matching the user's selection criteria.

10. A system as claimed in claim 9, wherein said alert signal activates a video monitor.

11. A system as claimed in claim 10, wherein said video monitor is a television set.

12. A system as claimed in claim 10, wherein said video monitor forms part of a multimedia computer environment.

13. A system as claimed in claim 12, wherein said multimedia computer environment also provides said user-operable selection means.

14. A system as claimed in claim 1, further comprising a short-term buffer for storing said program signal streams for a predetermined period to permit access to program content for a preselected time prior to detection of a program content match.

15. A system as claimed in claim 1, which is connected to a computer network to permit clients thereon to individually perform queries and receive programs from the system according to their respective program criteria.

16. A system as claimed in claim 9, wherein said device transmits said alert signal to a remote location for reception by the user.

17. A system as claimed in claim 16, wherein said alert signal is a beeper signal.

18. A system as claimed in claim 1, where said broadcast television signals include a plurality of channels, said recognition means generate a plurality of data streams corresponding to said respective channels, and said comparator continually compares said program data contained in said plurality of program data streams with said stored data so as to monitor simultaneously said plurality of channels.

19. A system as claimed in claim 1, wherein said database stores a plurality of predefined user profiles representing preselected criteria for respective users, and means are provided to activate any one of said predefined user profiles.

20. A system as claimed in claim 1, wherein said recognition means generate said program data stream from signals transmitted in the vertical blanking interval between successive television frames.

21. A system as claimed in claim 1, wherein said broadcast signals are radio signals.

22. A system as claimed in claim 1, which is located in a network server, said network server sending said program signals over the network to clients located thereon in response to a match between said program data stream and said stored data.

23. A system as claimed in claim 22, which is located in a network server, wherein said network server forms part of a local area network.

24. A system as claimed in claim 22, wherein said network server is located remotely from said clients and a long-distance communications link is established between said network server and said clients.

25. A multimedia computer system, comprising:
a) a central processing unit;
b) a video capture unit for receiving broadcast television signals and generating a video signal therefrom;
c) a video display unit capable of display said video signals under program control;
d) means for decoding data signals embedded in said television signals and generating a program data stream representative of program content of said television signals and changing dynamically therewith;
e) means for inputting criteria identifying program content of interest to a user,
f) a database for storing data representing said criteria;
g) means for storing a program segment and the program data stream associated therewith while maintaining synchronism between the program data stream and the program segment.

26. A multimedia computer system as claimed in claim 25, wherein said data signals are embedded in the vertical blanking interval of said television signals.

27. A multimedia computer system as claimed in claim 26, wherein data signals are closed caption signals.

28. A multimedia computer system as claimed in claim 26, wherein said stored data represent one or more keywords selected by the user.

29. A multimedia computer system as claimed in claim 27, wherein said stored data represent a plurality of keywords, and said output condition is generated when said plurality of keywords are detected in said program data stream within a preselected period in accordance with predefined Boolean logic.

30. A multimedia computer system as claimed in claim 29, wherein said stored segments have a length preset by the user.

31. A multimedia computer system as claimed in claim 25, further comprising a buffer for temporarily storing said video signals prior to comparison of the associated program data with said stored data, said central processing unit being programmed to store a segment of said video signals for a period starting from a preselected amount of time prior to detection of a match of said program data and said stored data and finishing a preselected amount of time after a match of said program data and said stored data.

32. A multimedia computer system as claimed in claim 31, wherein said central processing unit stores multiple said segments indexed on the basis of said program data.

33. A multimedia computer system as claimed in claim 25, wherein said computer system has an operating system employing multiple windows, and said video signals generated from the broadcast television signals appear in one or more of said multiple windows under program control as said broadcast television signals are received.

34. A multimedia computer system as claimed in claim 33, wherein said video signals appear in one or more of said multiple windows in response to a match of said program data and said stored data.

35. A multimedia computer system as claimed in claim 34, wherein said central processing unit is programmed to display a listing of stored segments in one of said multiple windows in response to a user command.

36. A multimedia computer system as claimed in claim 25, wherein text information derived from said program data stream is displayed in said second window.

37. A multimedia computer system as claimed in claim 25, which forms part of a network server, said network server distributing program signals to clients on the network in response to said output condition or a user request.

38. A multimedia computer system as claimed in claim 37, wherein said network is a local area network.

39. A multimedia computer system as claimed in claim 37, wherein said clients are connected to said network server over long-distance communications links.

40. A method of monitoring broadcast television signals, comprising the steps of:
a) extracting program signal streams from said broadcast television signals;

b) generating from the broadcast television signals a program data stream separate from said program signal streams, said program data stream being representative of program content and changing dynamically therewith;

c) comparing said program data stream with stored data identifying program content of interest to the user;

d) storing, when said generated program data stream matches said stored data, a program segment and the program data stream associated therewith while maintaining synchronism between the program data stream and the program segment; and e) displaying and playing back in a first window video frames of said stored program segment;

f) displaying in a second window said dynamic program data stream while identifying a portion of said displayed data stream corresponding to a displayed frame;

g) and selecting a portion of the dymanic program data stream corresponding to a protion of interest of said stored program segment to cause video frames corresponding to said portion of interest to be played back in said first window.

41. A method as claimed in claim 40, wherein said program data stream is extracted from signals embedded in said broadcast signals.

42. A method as claimed in claim 41, wherein said broadcast signals are television signals and said data signals are embedded in the vertical blanking interval thereof.

43. A method as claimed in claim 42, wherein said embedded data signals are closed caption signals.

44. A method as claimed in claim 41, wherein an alarm signal is generated to alert the user to the presence of matching data.

45. A method as claimed in claim 40, wherein a video monitor is activated to permit the user to watch the program material in response to the presence of matching data.

46. A method as claimed in claim 45, wherein said video monitor forms part of a multimedia computer system.

47. A method as claimed in claim 40, wherein said broadcast signals are received in digital format.

48. A method as claimed in claim 40, which takes place in a network server, and where said program signals are sent to clients on the network.

49. A method as claimed in claim 48, wherein said program signals are transmitted over a long-distance communications link to a remote said client in response to said output condition or a client request.

50. A computer-readable storage medium having binary information encoded thereon, said binary information being operable when interpreted by a computer to direct the computer to monitor broadcast television signals and generate program signal streams to permit the presentation of program material carried by the broadcast signals to a user; analyze incoming broadcast television signals to generate a program data stream separate from said program signals, said program data stream being representative of their program content and changing dynamically therewith; compare said data stream with stored data identifying program content of interest; store, when said generated data matches said stored data, a program segment and the program data stream associated therewith while maintaining synchronism between the program data stream and the program segment; display and playback in a first window video frames of said stored program segment and display in a second window said dynamic program data stream; identify a portion of said displayed data stream corresponding to a displayed frame; and permit the user to select a portion of the dynamic program data stream corresponding to a portion of interest of said stored program segment and thereby cause video frames corresponding to said portion of interest to be played back in said first window.

51. A computer-readable storage medium as claimed in claim 50, wherein said binary information directs the computer to generate said data stream from data signals embedded in said broadcast signals.

52. A computer-readable storage medium as claimed in claim 50, wherein said binary information directs the computer to generate said data stream from data signals embedded in the vertical blanking interval between successive frames.

53. A computer-readable storage medium as claimed in claim 51, wherein said embedded data signals are closed caption signals.

54. A computer-readable storage medium as claimed in claim 51, wherein said binary information directs the computer to generate an alarm signal to alert the user when a match of said program data and said stored data occurs.

55. A computer-readable storage medium as claimed in claim 51, wherein said binary information directs the computer to activate a video monitor to permit the user to watch program material carried by said broadcast signals when a match of said program data and said stored data occurs.

56. A computer-readable storage medium as claimed in claim 50, wherein said video monitor forms part of a multimedia computer system.

57. A computer-readable storage medium as claimed in claim 50, wherein said computer runs under an operating system employing multiple windows and said binary information directs the computer to display program material carried by said broadcast television signals in a window of said operating system in accordance with user instructions.

58. A computer-readable storage medium as claimed in claim 50, wherein said binary information directs the computer to display program material carried by said broadcast signals in a said window in response to a match of said program data stream and said stored data.

59. A computer-readable storage medium as claimed in claim 50, wherein said computer is a network server.

* * * * *